United States Patent
Ueda et al.

(10) Patent No.: US 9,518,373 B1
(45) Date of Patent: Dec. 13, 2016

(54) CONSTRUCTION MACHINE WITH ENGINE

(71) Applicant: KOBELCO CONSTRUCTION MACHINERY CO., LTD., Hiroshima-shi (JP)

(72) Inventors: Kazuhiro Ueda, Hiroshima (JP); Seiichi Onishi, Hiroshima (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 0 days.

(21) Appl. No.: 15/139,378

(22) Filed: Apr. 27, 2016

(30) Foreign Application Priority Data

Jun. 8, 2015 (JP) ................................ 2015-115375

(51) Int. Cl.
*B60K 11/06* (2006.01)
*E02F 9/08* (2006.01)
*B62D 25/12* (2006.01)

(52) U.S. Cl.
CPC .......... *E02F 9/0866* (2013.01); *B60K 11/06* (2013.01); *B62D 25/12* (2013.01)

(58) Field of Classification Search
CPC ...................................................... B60K 11/06
USPC ....................................................... 180/68.1
See application file for complete search history.

(56) References Cited

U.S. PATENT DOCUMENTS

| | | | | |
|---|---|---|---|---|
| 3,788,418 A | * | 1/1974 | Clancy .................. | B62D 55/062 165/51 |
| 4,739,823 A | * | 4/1988 | Howard ................. | B64D 13/00 165/104.34 |
| 5,791,301 A | * | 8/1998 | Watanabe .............. | B60K 11/06 123/41.31 |
| 5,816,350 A | * | 10/1998 | Akira ................... | B60H 1/3227 180/68.1 |
| 5,816,351 A | * | 10/1998 | Akira ..................... | B60K 11/08 180/68.1 |
| 6,167,976 B1 | * | 1/2001 | O'Neill .................. | B62D 25/10 123/41.49 |
| 6,192,839 B1 | * | 2/2001 | Takeshita .............. | E02F 9/0866 123/41.49 |

(Continued)

FOREIGN PATENT DOCUMENTS

| | | |
|---|---|---|
| EP | 1 637 710 A1 | 3/2006 |
| JP | 2001-193102 | 7/2001 |
| JP | 2005-16321 | 1/2005 |

*Primary Examiner* — Jeffrey J Restifo
(74) *Attorney, Agent, or Firm* — Oblon, McClelland, Maier & Neustadt, L.L.P.

(57) ABSTRACT

Provided is a construction machine including exhaust ducts and favorably discharging air from an engine room through an air outlet. The construction machine includes an engine room with an upper wall portion and a cooling fan, the upper wall portion formed with first and second exhaust ducts. The first exhaust duct includes an upstream portion extending in a first horizontal direction and a downstream portion extending upward from a terminal end of the upstream portion to a first air outlet. The second exhaust duct includes a cross portion crossing the upstream portion in a second horizontal direction perpendicular to the first horizontal direction above the upstream portion. The cross portion allows air to flow from a second air inlet opened downward and sideward of the upstream portion to a second air outlet opposite to the second air inlet, through an upper side of the upstream portion.

8 Claims, 11 Drawing Sheets

(56) References Cited

U.S. PATENT DOCUMENTS

| | | | | |
|---|---|---|---|---|
| 6,431,299 B1* | 8/2002 | Asche | B60K 11/08 | 180/68.1 |
| 6,540,036 B1* | 4/2003 | Sugano | E02F 3/325 | 180/68.1 |
| 6,622,668 B2* | 9/2003 | Izumi | E02F 9/00 | 123/41.49 |
| 6,655,486 B2* | 12/2003 | Oshikawa | B60K 11/08 | 180/68.1 |
| 6,745,860 B2* | 6/2004 | Yabe | E02F 9/0866 | 180/68.1 |
| 6,922,925 B2* | 8/2005 | Watanabe | E02F 3/325 | 123/41.49 |
| 7,131,422 B2* | 11/2006 | Kimura | B60R 13/0838 | 123/198 E |
| 7,134,518 B2* | 11/2006 | Arai | B60K 11/04 | 180/68.1 |
| 7,143,852 B2* | 12/2006 | Yatsuda | B62D 25/10 | 180/68.1 |
| 7,182,164 B2* | 2/2007 | Merlo | B60K 11/04 | 180/68.1 |
| 7,451,843 B2* | 11/2008 | Nakashima | B60K 11/08 | 180/68.1 |
| 7,828,097 B2* | 11/2010 | Kondou | B60K 11/02 | 180/68.1 |
| 7,841,314 B2* | 11/2010 | Nakashima | E02F 9/0866 | 123/198 E |
| 8,006,991 B2* | 8/2011 | Taniuchi | E02F 9/0833 | 180/68.1 |
| 8,550,198 B2* | 10/2013 | Isaka | B60K 11/04 | 180/291 |
| 8,631,890 B2* | 1/2014 | Noguchi | B60K 11/06 | 180/311 |
| 8,684,116 B2* | 4/2014 | Nakashima | B60K 11/08 | 180/68.1 |
| 8,893,840 B2* | 11/2014 | Rogers | B62D 25/10 | 180/69.2 |
| 2001/0007292 A1* | 7/2001 | Yabf | E02F 9/0866 | 180/68.1 |
| 2004/0173395 A1* | 9/2004 | Arai | B60K 11/04 | 180/68.1 |
| 2004/0216934 A1* | 11/2004 | Tomiyama | B60K 11/04 | 180/68.1 |
| 2006/0144350 A1* | 7/2006 | Nakashima | B60K 11/08 | 123/41.01 |
| 2007/0090650 A1* | 4/2007 | Komiyama | E02F 9/0866 | 290/40 C |
| 2008/0034621 A1* | 2/2008 | Taniuchi | E02F 9/0833 | 37/379 |
| 2010/0219008 A1* | 9/2010 | Isaka | B60K 11/04 | 180/68.1 |
| 2013/0228388 A1* | 9/2013 | Ueda | B60K 11/04 | 180/68.1 |
| 2014/0014426 A1* | 1/2014 | Lauper, Jr. | F01P 5/06 | 180/68.1 |
| 2014/0166380 A1* | 6/2014 | Numasawa | E02F 9/0866 | 180/68.1 |
| 2014/0238759 A1* | 8/2014 | Kanamaru | E02F 9/0866 | 180/68.1 |
| 2014/0301816 A1* | 10/2014 | Kokuryo | B60K 11/04 | 414/687 |
| 2015/0114748 A1* | 4/2015 | Hanada | E02F 9/0866 | 180/309 |
| 2015/0211210 A1* | 7/2015 | Miyachi | E02F 9/0866 | 180/68.1 |

* cited by examiner

CONSTRUCTION MACHINE WITH ENGINE

TECHNICAL FIELD

The present invention relates to a construction machine including an engine and an engine room for housing the engine and having a function of cooling a cooled object within the engine room.

BACKGROUND ART

There have been known construction machines such as hydraulic shovels each including an engine and an engine room for housing the engine, wherein the engine room houses a cooled object such as a heat exchanger and a cooling fan producing cooling air flow for cooling the cooled object. These construction machines include one having an exhaust duct formed in an external wall configuring the engine room, such as an engine guard or engine hood (also called "bonnet") enclosing the internal space of the engine room, wherein the air produced by the cooling fan to cool the cooled object is discharged to the outside of the engine room through the exhaust duct. The exhaust duct has a function of enabling the air in the engine room to be discharged while suppressing leakage of the noise of the engine room to the outside by the shape of a channel formed by the exhaust duct or a sound absorption member provided on an inner surface of the exhaust duct.

For example, FIG. 12 of Japanese Unexamined Patent Publication No. 2001-193102 shows a construction machine including an engine, an engine room for housing the engine, and a cooling fan for producing cooling air flow in the engine room, wherein an exhaust duct extending horizontally along an axial direction of the engine is formed in an upper portion of the engine room, allowing the air of the engine room to be discharged horizontally to the outside of the engine room through the exhaust duct and an air outlet formed at the terminal end of the exhaust duct.

Thus configured construction machine formed with an exhaust duct and an air outlet in an upper portion of an engine room, however, may involve a problem that the components located in the vicinity of the air outlet, such as other devices and structures, inhibit smooth discharge of the air through the air outlet. For instance, a construction machine including an exhaust gas treatment device for purifying the exhaust gas discharged from the engine housed in the engine room may require the exhaust gas treatment device to be placed near the air outlet so as to protrude significantly upward beyond the engine hood, thus preventing the air from being smooth discharged from the air outlet.

In order to allow the air from being smooth discharged through the air outlet regardless of the presence of the exhaust gas treatment device and the like in the vicinity of the air outlet of the exhaust duct, the entire exhaust duct including the air outlet has to have a shape protruding upward beyond the upper end of the exhaust gas treatment device or the like. Establishing this shape, however, requires an increased height of the exhaust duct and further an increased height of the entire engine room, which is not preferable. In other words, it is difficult to allow the air to be smooth discharged through the air outlet of the exhaust duct while giving the engine room a restrained entire height.

Meanwhile, the exhaust duct is required to have an exhaust flow path with large area. It is, however, not preferable to simply enlarge the area of the flow path of the exhaust duct, which deteriorates the noise suppression effect.

SUMMARY OF INVENTION

It is an object of the present invention to provide a construction machine including an engine and an engine room for housing the engine, the engine room having an upper portion formed with an exhaust duct, the exhaust duct being capable of allowing air to be favorably discharged through an air outlet formed at the terminal end of the exhaust duct and having a large flow path area without deteriorating the noise suppression effect.

Provided is a construction machine, including: an engine; an engine room having an external wall enclosing an internal space for housing the engine; a cooled object disposed in the internal space of the engine room; and a cooling fan that is driven to produce cooling air flow for cooling the cooled object in the internal space of the engine room. The external wall of the engine room includes an upper wall portion located on an upper side of the internal space, the upper wall portion being formed with a first exhaust duct and a second exhaust duct for guiding air inside the internal space to an outside of the engine room. The first exhaust duct includes an upstream portion extending in a first horizontal direction and having one end which forms a first air inlet and a downstream portion extending upward from a terminal end of the upstream portion to a first air outlet opened upward in the upper wall portion, the first exhaust duct allowing air to flow from the first air inlet to the first air outlet. The second exhaust duct includes a cross portion crossing the upstream portion of the first exhaust duct on an upper side of the upstream portion in a second horizontal direction perpendicular to the first horizontal direction, the second exhaust duct having a second air inlet opened downward at a position sideward of the upstream portion of the first exhaust duct with respect to the second horizontal direction and a second air outlet opened laterally at a position opposite to the air inlet across the cross portion in the upper wall portion. The cross portion allows air to flow from the second air inlet to the second air outlet through an upper side of the upstream portion of the first exhaust duct.

Note that the expressions "extending in the first horizontal direction" and "crossing in the second horizontal direction" specify that each of the upstream portion of the first exhaust duct and the cross portion of the second exhaust duct has a shape substantially along a horizontal direction so as to be able to guide the air in the horizontal direction, not intending to exclude one whose wall constituting the upstream portion or the cross portion is inclined with respect to a horizontal surface.

DESCRIPTION OF EMBODIMENTS

A preferred embodiment of the present invention is now described with reference to the drawings.

Figure 1:
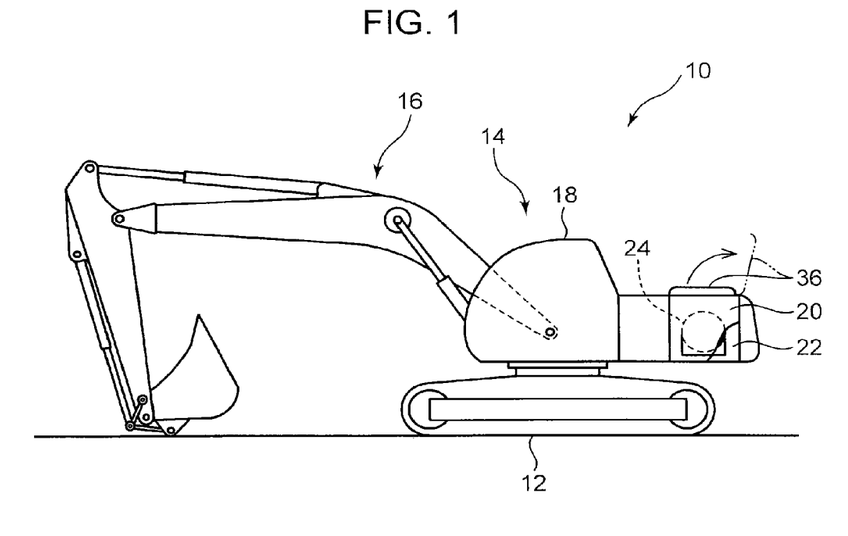
FIG. 1 is a side view of a hydraulic shovel according to an embodiment of the present invention.

FIG. 1 shows a hydraulic shovel 10 according to the embodiment. This hydraulic shovel 10 is an example of a construction machine to which the present invention is employed. The construction machine is not limited to the hydraulic shovel 10. The present invention can be employed widely to construction machines each including an engine and an engine room for housing the engine wherein a cooled object and a cooling fan are also housed in the engine room.

The hydraulic shovel 10 includes a lower traveling body 12, an upper slewing body 14 mounted in a revolvable manner on the lower traveling body 12, and a work attachment 16 supported on the upper slewing body 14. The upper slewing body 14 includes an operation room 18, an engine room 20, a counterweight 22.

Figure 2:
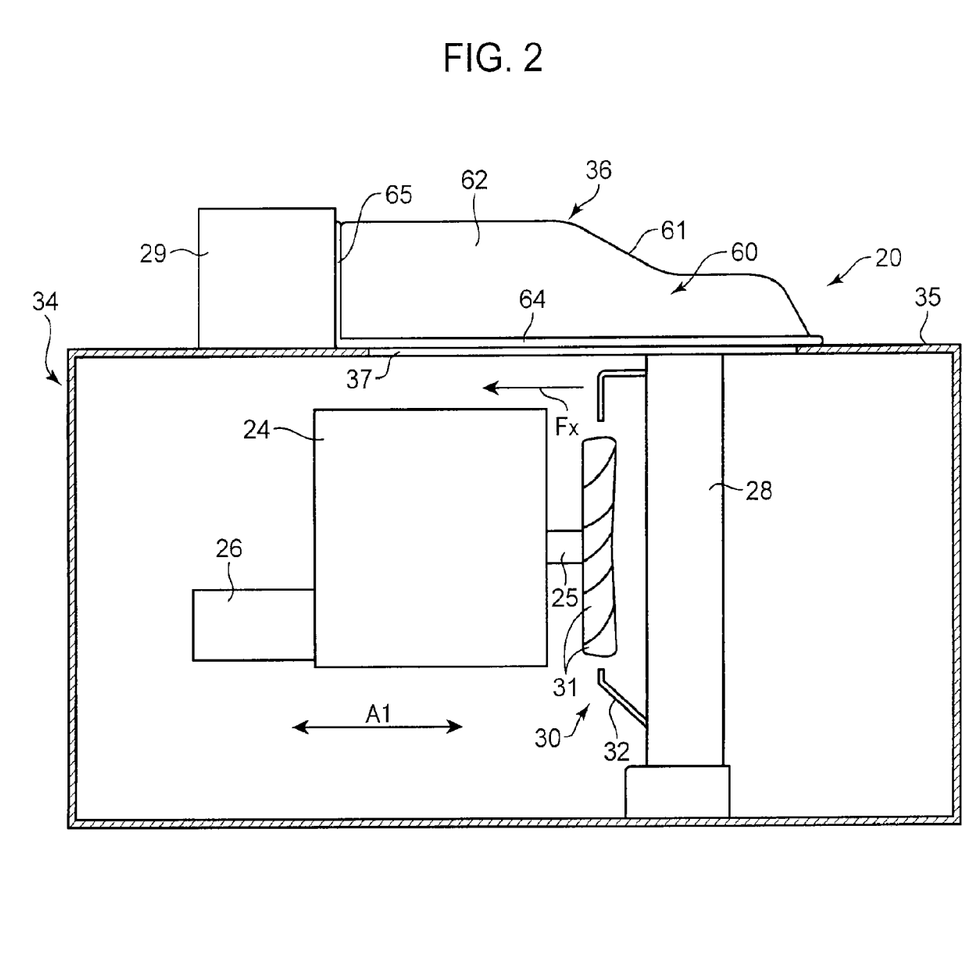
FIG. 2 is a cross-sectional front view showing an internal structure of an engine room of the hydraulic shovel, the internal structure being viewed from the front of an upper slewing body of the hydraulic shovel.

The engine room 20 forms a rear portion of the upper slewing body 14 and houses an engine 24, a hydraulic pump 26, a heat exchanger 28, a cooling fan 30 and the like, as shown in FIG. 2.

Figure 7:
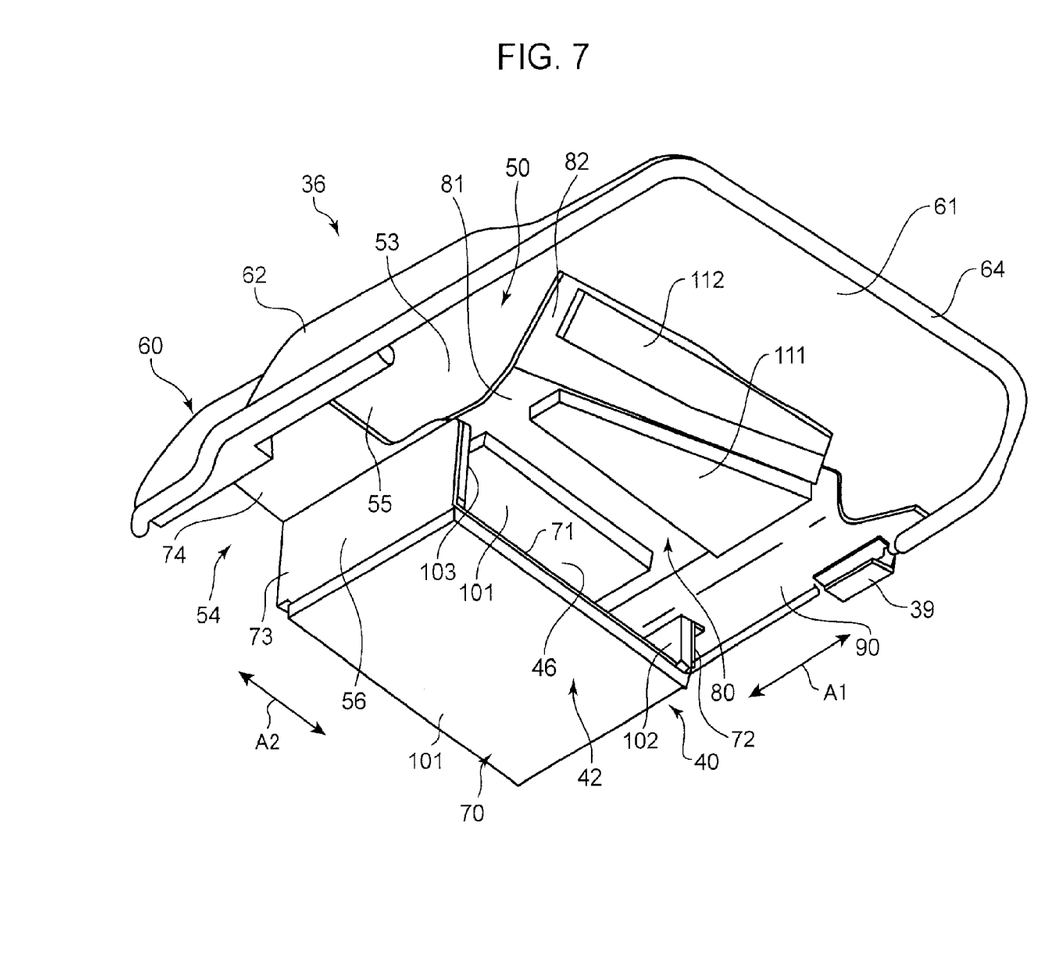
FIG. 7 is a perspective view in which the engine hood is viewed from below.
Figure 8:
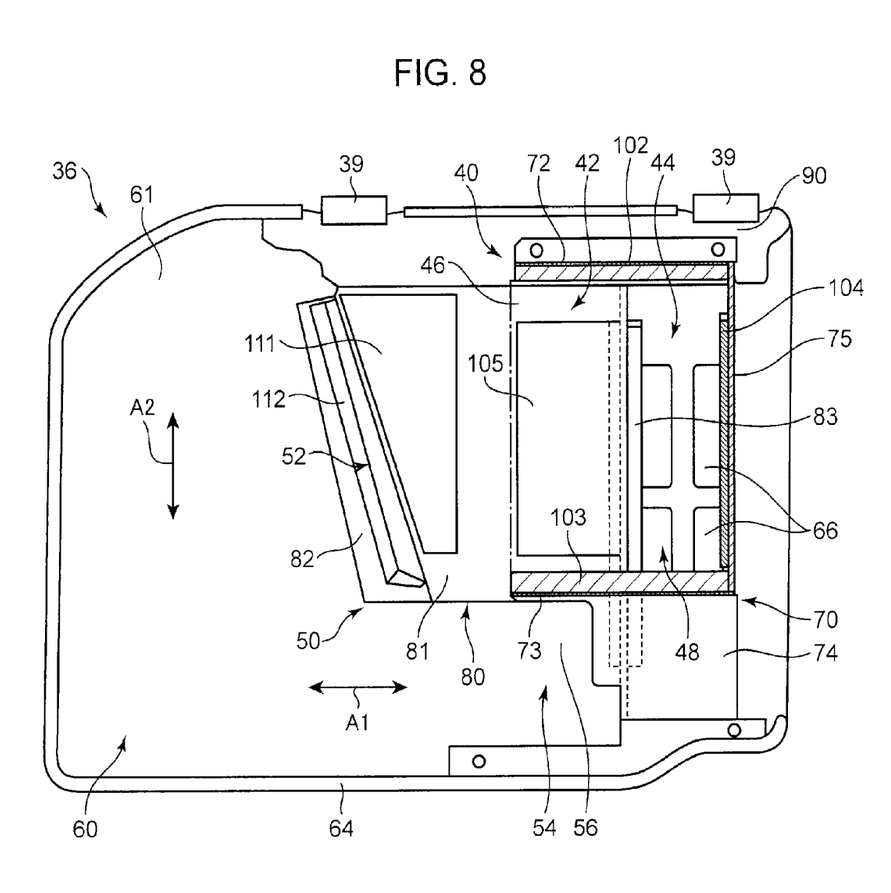
FIG. 8 is a cross-sectional diagram taken along VIII-VIII of FIG. 5.

The engine 24 includes an engine output shaft 25 and is disposed inside the engine room 20 in such an attitude that the engine output shaft 25 is parallel to a first horizontal direction indicated by the arrow A1 in FIG. 2 (and FIGS. 7 to 9), that is, a lateral direction of the upper slewing body 14 in the present embodiment. In other words, the engine 24 is laid down in the engine room 20 in such a horizontal attitude that the engine 24 is perpendicular to a horizontal direction perpendicular to the first horizontal direction, namely, a second horizontal direction indicated by the arrow A2 in FIG. 3 (and FIGS. 7, 8 and 10) or, that is, a front-back direction of the upper slewing body 14 in the present embodiment. The hydraulic pump 26 is coupled to the engine 24 and driven by the engine 24 to thereby discharge hydraulic oil.

The heat exchanger 28 is a cooled object, which is an object to be cooled, for example, a radiator.

Figure 3:
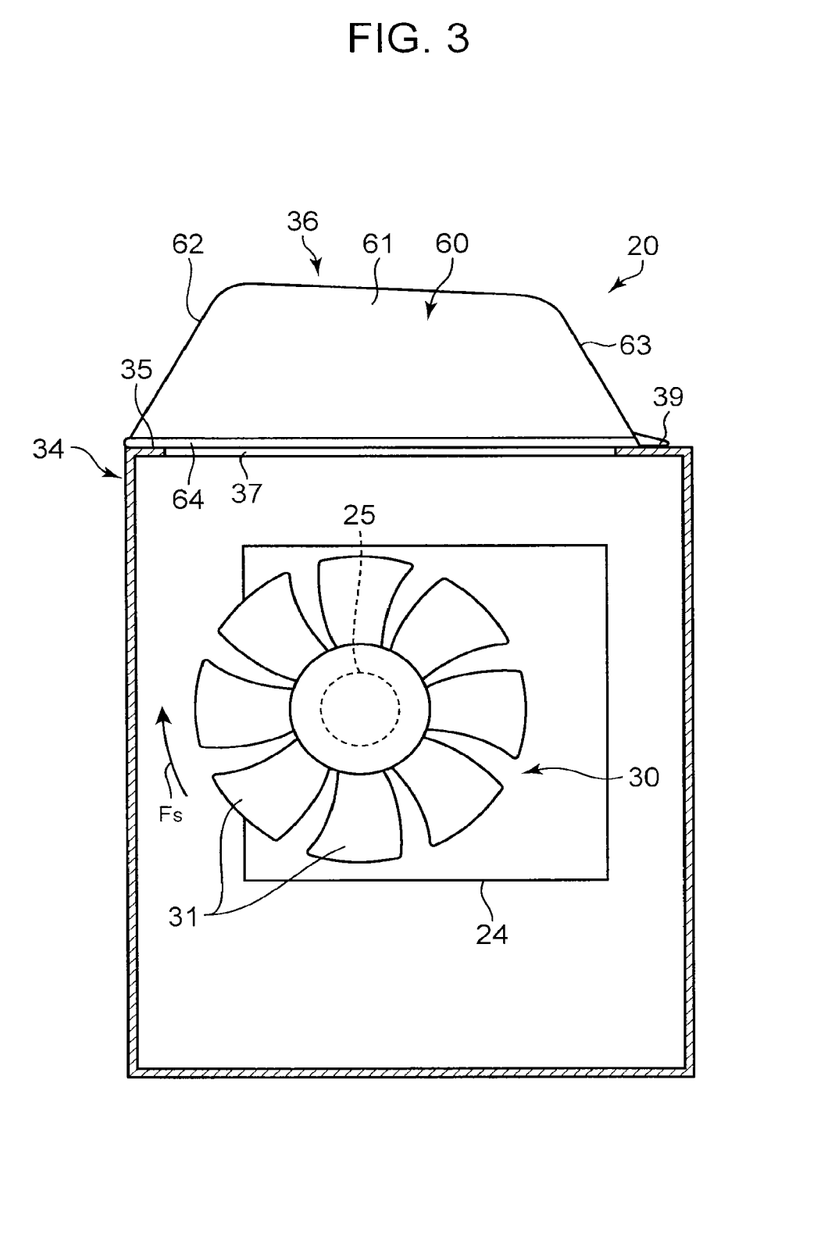
FIG. 3 is a partial cross-sectional side view showing the internal structure of the engine room.

The cooling fan 30 has a plurality of blades 31 connected to the engine output shaft 25 as shown in FIG. 3 and a fan shroud 32 which is not shown in FIG. 3. The plurality of blades 31 are rotated in synchronization with the rotation of the engine output shaft 25, thereby forming flows of air for cooling the heat exchanger 28: specifically, an axial flow Fx from the heat exchanger 28 to the engine 24 in parallel to the engine output shaft 25 as shown in FIG. 2 and a rotational flow Fs along the rotational direction of the plurality of blades 31 around the engine output shaft 25 as shown in FIG. 3.

The engine room 20 has an external wall enclosing an internal space for housing the engine 24 and the like. The external wall includes an external-wall main body 34 and an engine hood 36.

The external-wall main body 34 is substantially in the shape of a rectangular cuboid in the present embodiment and includes a top wall 35 defining the internal space at upper side thereof. The top wall 35 is formed with an opening 37 for opening the internal space upward.

The engine hood 36, which corresponds to an upper wall portion on the upper side of the internal space, is attached to the top wall 35 so as to open and close the opening 37. Specifically, as shown in FIG. 3, the engine hood 36 is connected to an edge portion of the top wall 35 by a plurality of hinges 39; the edge portion is a part of an edge surrounding the opening 37 and located rearward of the opening 37 (on the right-hand side of FIG. 3). The hinges 39 support the rear edge of the engine hood 36 so as to allow the engine hood 36 to make rotational movement about an axis parallel to the first horizontal direction. The rotational movement allows the engine hood 36 to move between the closed position in which the engine hood 36 closes the opening 37 (shown by the solid line in FIG. 1) and the open position in which the engine hood 36 opens the opening 37 (shown by the two-dot chain line in FIG. 1), as shown in FIGS. 2 and 3.

This construction machine also includes an exhaust gas treatment device 29 for purifying the exhaust gas of the engine 24. In the present embodiment, the exhaust gas treatment device 29 is disposed so as to protrude upward beyond the top wall 35, as shown in FIG. 2, and adjacent to the engine hood 36 on the right side (the left-hand side of FIG. 2) thereof. FIG. 2 shows only a housing in the shape of a substantially rectangular cuboid, which is one of elements included in the exhaust gas treatment device 29.

The external-wall main body 34 is formed with a not-graphically shown inlet port through which air outside the engine room 20 is introduced into the space within the engine room 20. Meanwhile, the engine hood 36 is formed with, as one of the features of this construction machine, a first exhaust duct 40 and a second exhaust duct 50 having respective air flow paths independent from each other. Each of the first and second exhaust ducts 40, 50 has a function of guiding the air in the internal space to the outside of the engine room while suppressing leakage of noise to the outside. The cooling fan 30 is driven to introduce the outside air into the engine room 20 through the inlet port by the rotation of the plurality of blades 31 to create the axial flow Fx and the rotational flow Fs and further to discharge air having been used to cool the heat exchanger 28 to the outside of the engine room 20 through the first and second exhaust ducts 40, 50.

Next will be described the basic configurations of the first and second exhaust ducts 40, 50 with reference to FIGS. 4 to 11 and then will be described the members for specifically forming the first and second exhaust ducts 40, 50.

The first exhaust duct 40 has an upstream portion 42 and a downstream portion 44 that are connected to each other in series.

The upstream portion 42, which extends in the first horizontal direction indicated by the arrow A1, is located downstream of the cooling fan 30 with respect to the direction of the axial flow Fx created by the cooling fan 30. The upstream portion 42 has an upstream end (a left end in FIG. 9) and a downstream end (a right end in FIG. 9), wherein the upstream end surrounds a first air inlet 46 and the downstream end configures a terminal end 43 closed with respect to the first horizontal direction.

The downstream portion 44 extends upward from the terminal end 43 of the upstream portion 42. The downstream portion 44 has an upper end, namely, a downstream end thereof, which reaches a first air outlet 48. The first air outlet 48 is opened to the outside of the engine hood 36, specifically, toward the space above the engine hood 36.

Figure 9:
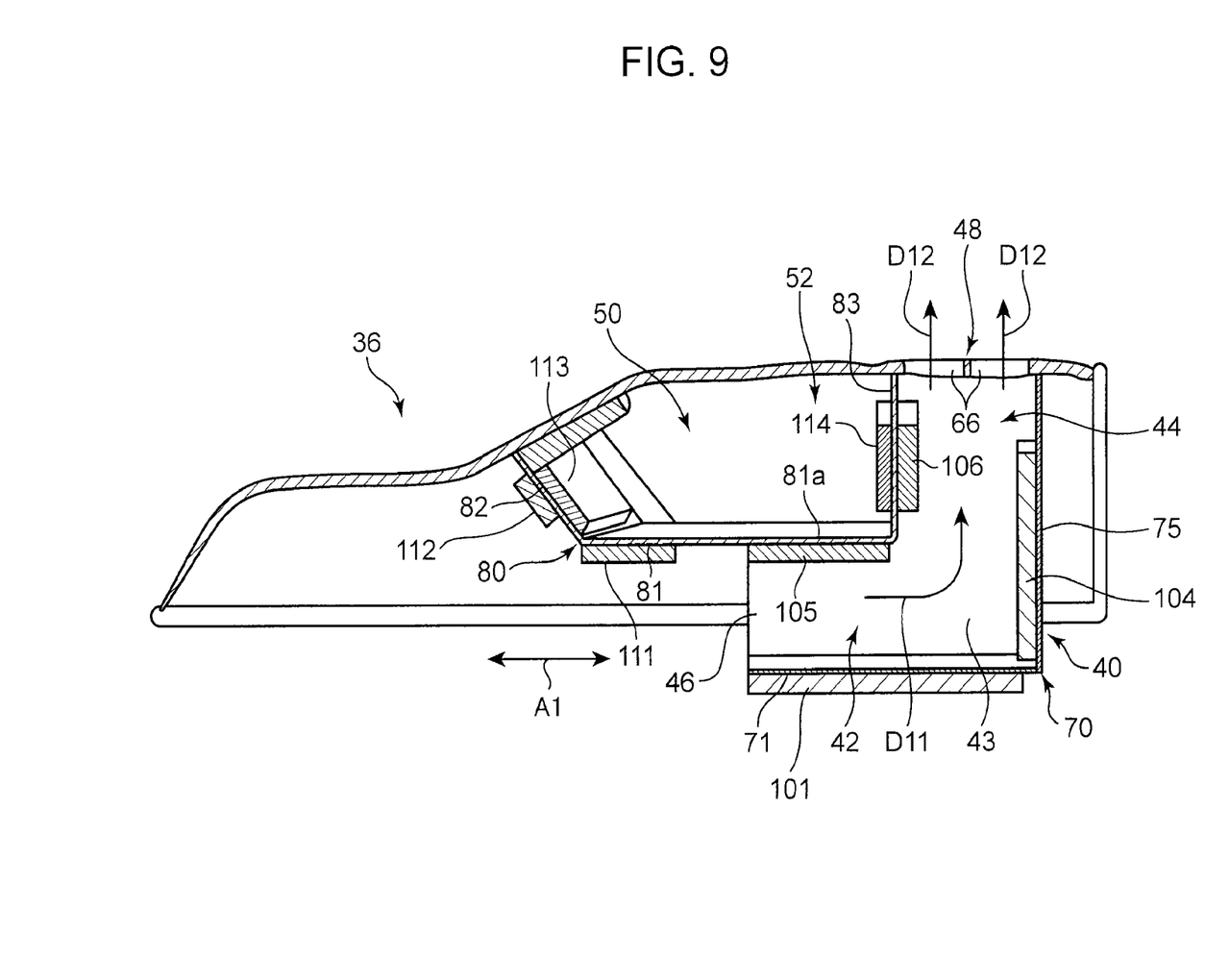
FIG. 9 is a cross-sectional diagram taken along IX-IX of FIG. 4.
Figure 11:
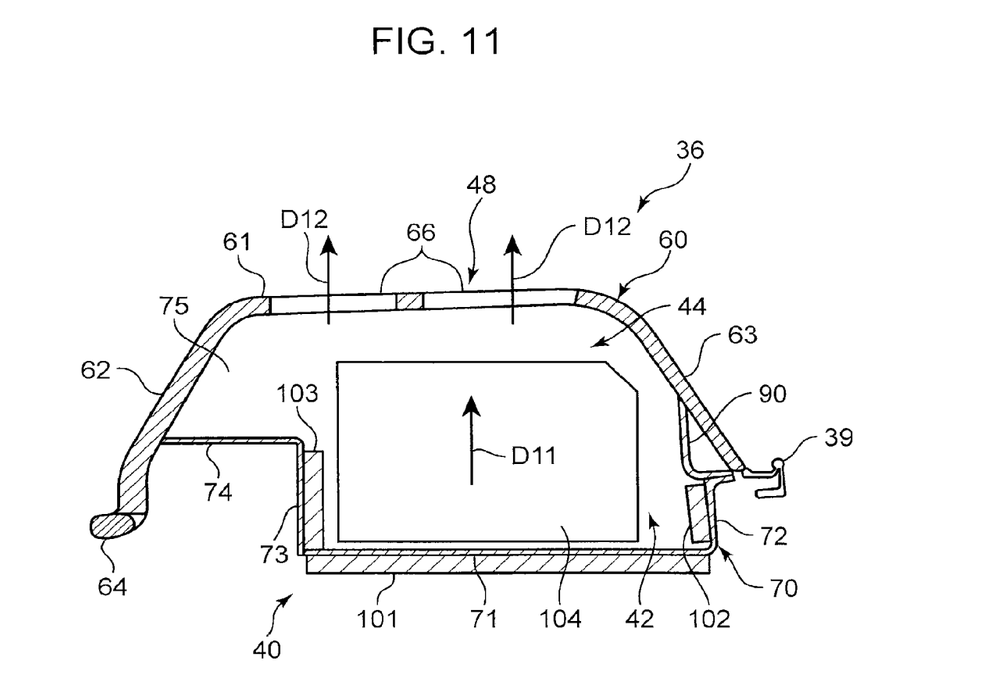
FIG. 11 is a cross-sectional diagram taken along XI-XI of FIG. 4.

The first exhaust duct 40 allows air to flow as indicated by the arrows D11, D12 shown in FIGS. 9 and 11. Specifically, the first exhaust duct 40 enables the air to flow from the first air inlet 46 through the inside of the upstream portion 42 along the first horizontal direction and further to flow upward from the terminal end 43 of the upstream portion 42 through the inside of the downstream portion 44 (the arrow D11), thereby allowing the air to be discharged upward to the outside of the engine hood 36 through the first air outlet 48 (the arrow D12).

The second exhaust duct 50 includes a cross portion 52. The cross portion 52 crosses the upstream portion 42 of the first exhaust duct 40 along the second horizontal direction indicated by the arrow A2, at a position on the upper side of the upstream portion 42, preferably a position just above the upstream portion 42.

The second exhaust duct 50 has a second air inlet 56 and a second air outlet 58. The second air inlet 56 is opened downward at a position sideward of the upstream portion 42 of the first exhaust duct 40 with respect to the second horizontal direction. The second air outlet 58 is opened toward a space sideward of the engine hood 36 and outside of the engine hood 36, at a position opposite to the foregoing air inlet across the cross portion 52 of the engine hood 36.

Specifically, the second exhaust duct 50 according to the present embodiment has an inlet-side portion 54 in addition to the cross portion 52. The inlet-side portion 54 is located downward of an upstream end portion 53 of the cross portion 52 and has a function of guiding the air of the engine room 20 upward from the second air inlet 56 to the upstream end portion 53.

Figure 10:
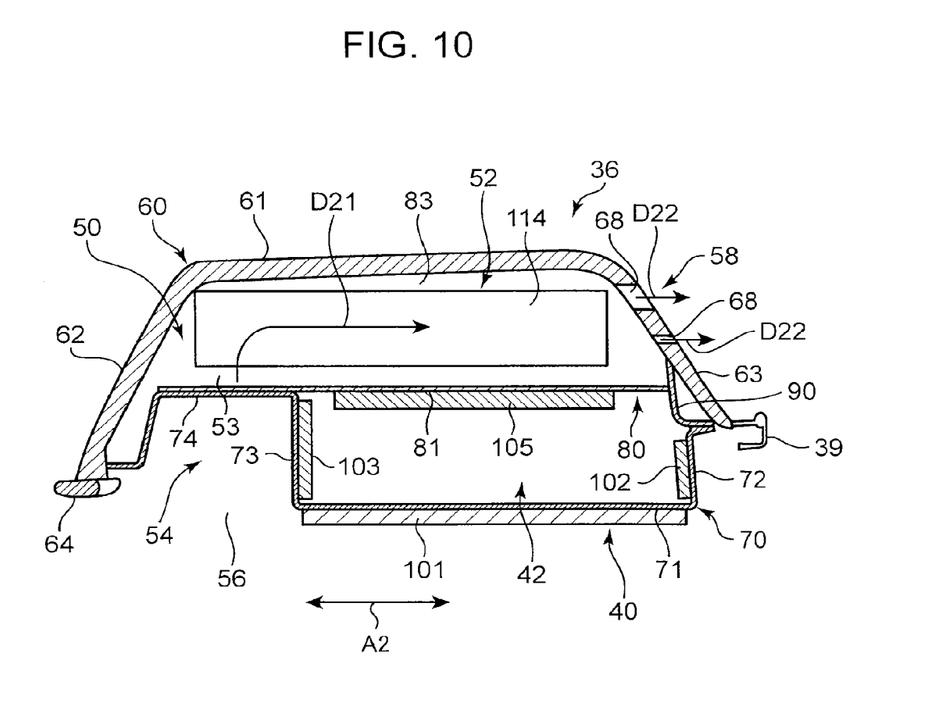
FIG. 10 is a cross-sectional diagram taken along X-X of FIG. 4.

The cross portion 52 enables air to flow as indicated by the arrows D21, D22 shown in FIG. 10, independently of the upstream portion 42 and the downstream portion 44 of the first exhaust duct 40. Specifically, the cross portion 52 enables the air introduced to the upstream end portion 53 to flow along the cross portion 52, i.e., along the second horizontal direction through the upper side of the upstream portion 42 of the first exhaust duct 40, to reach the second air outlet 58 (the arrow D21), thereby allowing the air to be discharged sideward through the second air outlet 58 (the arrow D22).

As the members for constructing the first and second exhaust ducts 40, 50 described above, the engine hood 36 includes a hood wall 60, a first duct member 70, a second duct member 80, and an auxiliary support member 90.

The hood wall 60, which configures the shell of the engine hood 36, bulges upward beyond the upper surface of the top wall 35 while closing the opening 37 in the state where the engine hood 36 is in the closed position as shown in FIGS. 2 and 3. The hood wall 60, thus, has a shape enclosing a hood internal space having a predetermined capacity and located over the opening 37.

Specifically, the hood wall 60 integrally includes a top wall portion 61, a front wall portion 62, and a rear wall portion 63. The top wall portion 61 has a curved-surface-like shape covering continuously the hood internal space at the upper side and the left-hand side in the upper slewing body 14 (the right-hand side of FIG. 2 and the left-hand sides of FIGS. 5 and 9). The front wall portion 62 and the rear wall portion 63 cover the hood internal space on the front side and rear side in the upper slewing body 14, respectively, and are integrated with the top wall portion 61 through a smooth curve.

Figure 5:
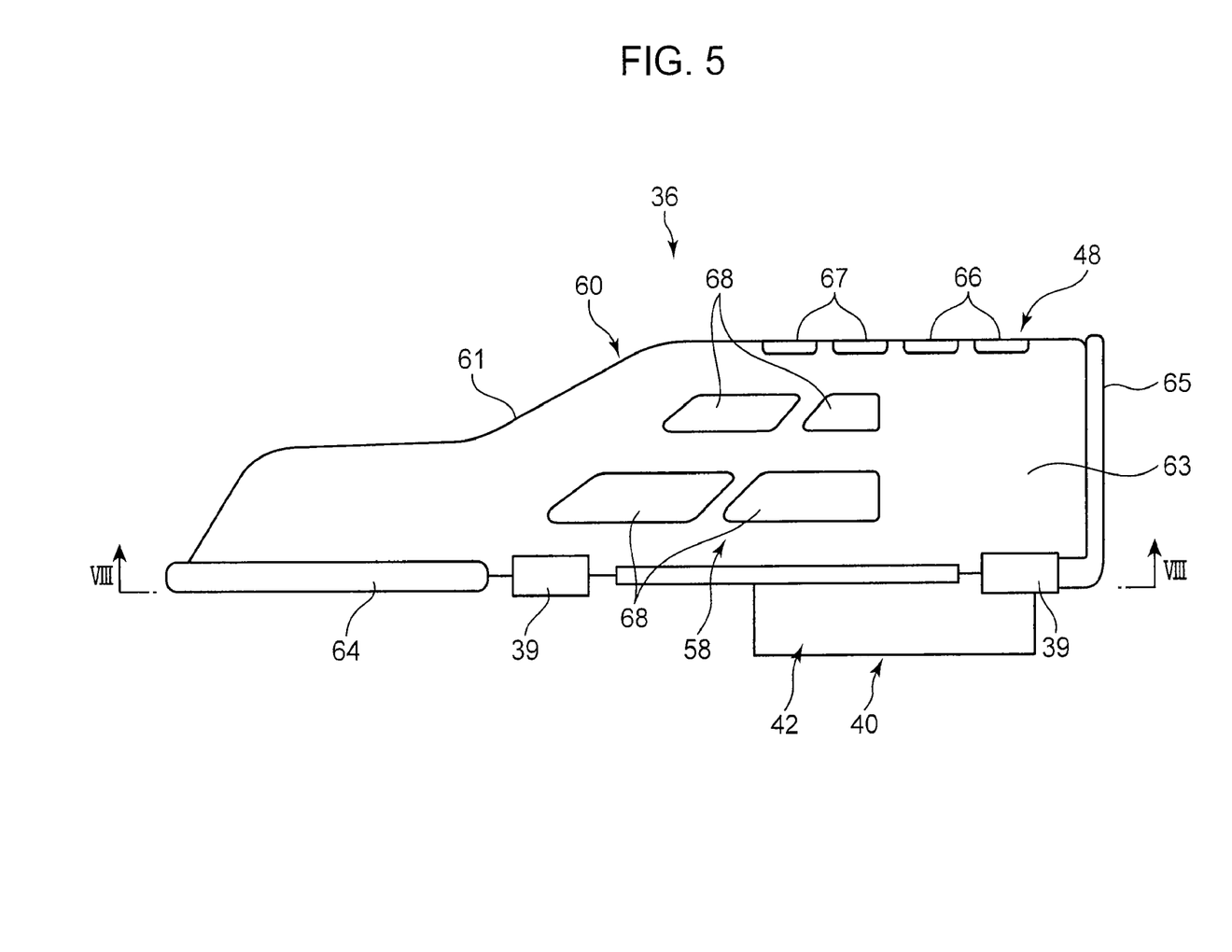
FIG. 5 is a rear view of the engine hood.

The hood wall 60, therefore, has a lower edge surrounding a lower opening located at a lower end of the hood wall 60 and a right edge surrounding a right opening located at a right end of the hood wall 60 (the right ends in FIGS. 5 and 9). The lower edge (precisely, a portion of the lower edge other than a part coupled to the hinges 39) and the right edge are provided with a lower seal material 64 and a right seal material 65, respectively. The lower and right seal materials 64, 65 are made of an elastically deformable material to serve to seal the hood internal space in the close state where the engine hood 36 is in the closed position. Specifically, the lower seal material 64 makes close contact with an upper surface of an open rim portion surrounding the opening 37 in the top wall 35, in the closed state, and the right seal material 65 makes close contact with a side wall of the housing of the exhaust gas treatment device 29, in the closed state.

Figure 4:
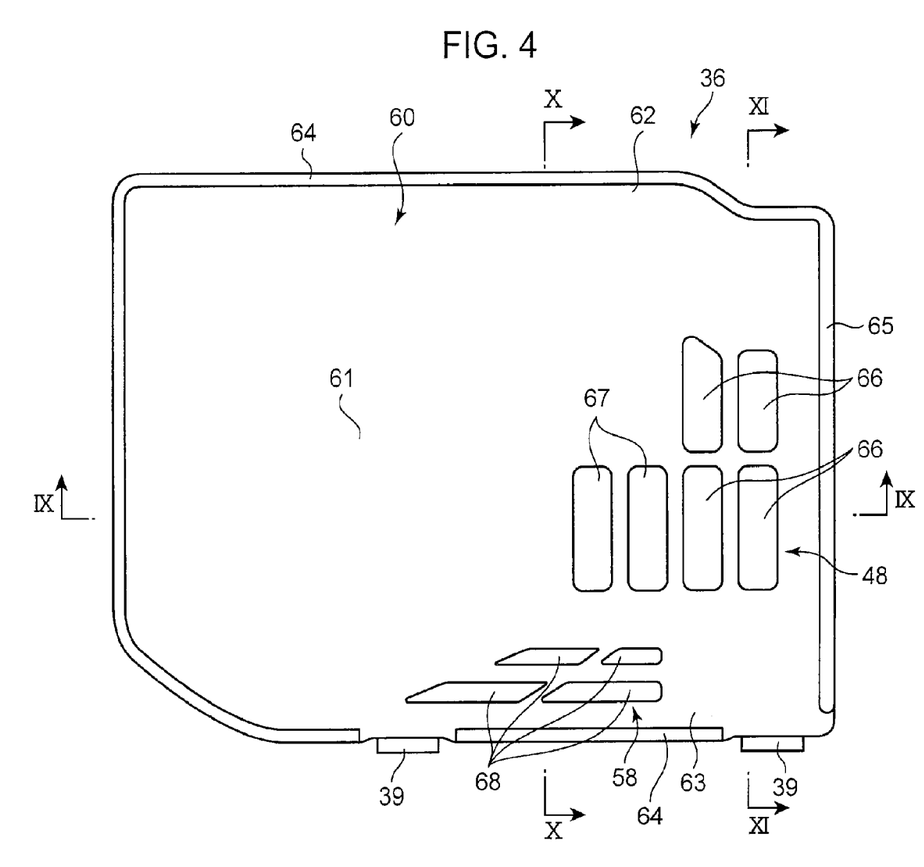
FIG. 4 is a plan view of an engine hood corresponding to an upper wall portion of an external wall of the engine room.
Figure 6:
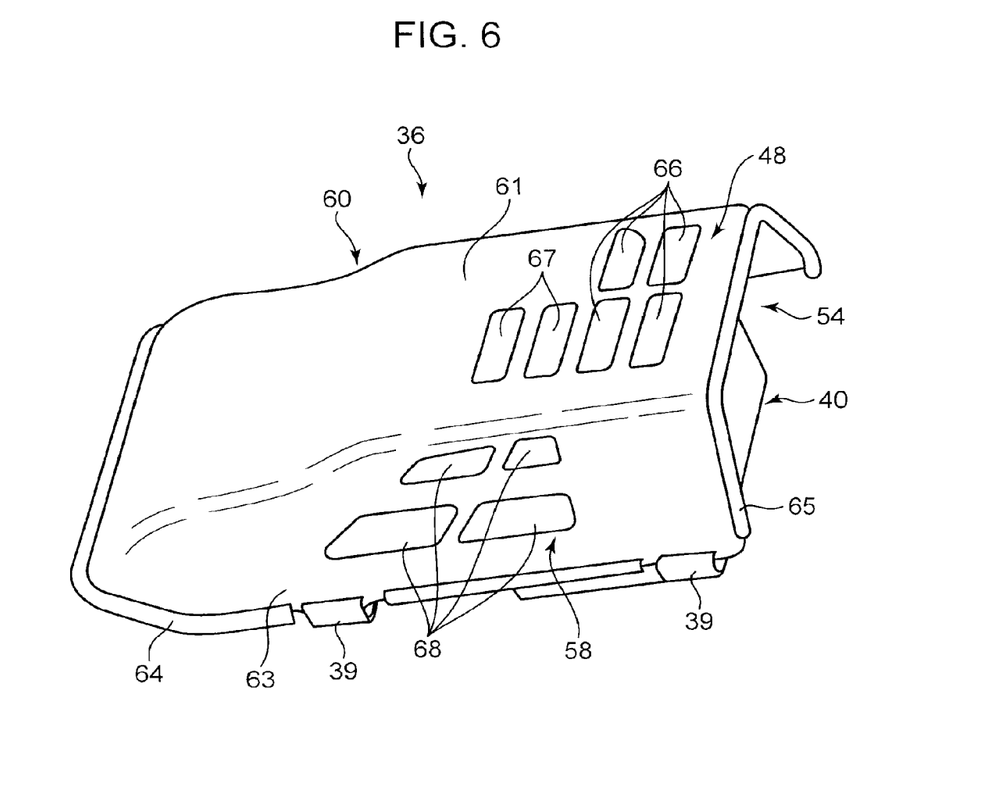
FIG. 6 is a perspective view showing the appearance in which the engine hood is viewed from above.

As shown in FIGS. 4 to 6, the top wall portion 61 is formed with a plurality of first openings 66 configuring the first air outlet 48 of the first exhaust duct 40, and the rear wall portion 63 is formed with a plurality of second openings 68 configuring the second air outlet 58 of the second exhaust duct 50. In addition to the plurality of first openings 66, the top wall portion 61 is also formed with a plurality of auxiliary openings 67 for complement of the outlet opening area of the second exhaust duct 50 separately from the second air outlet 58.

The auxiliary support member 90, which is a member for auxiliary supporting the first and second duct members 70, 80, extends in the first horizontal direction along a lower edge of the rear wall portion 63 of the hood wall 60 and is fixed to the lower edge.

The first duct member 70 is a member for forming mainly the first exhaust duct 40. The first duct member 70 has a bottom plate portion 71, a first side plate portion 72, a second side plate portion 73, a connecting plate portion 74, and a vertical plate portion 75, wherein the bottom plate portion 71, the first and second side plate portions 72, 73, and the connecting plate portion 74 are formed of a single plate member.

The bottom plate portion 71 configures a bottom wall of the upstream portion 42 of the first exhaust duct 40. Specifically, the bottom plate portion 71 has a flat-plate-like shape extending along the first horizontal direction and has a smaller width than that of a lower end opening of the hood wall 60 (the size in the second horizontal direction).

The first side plate portion 72 configures a side wall which is one of the side walls of the upstream portion 42 and located on opposite side to the second air inlet 56 (on the rear side in the front-back direction of the upper slewing body 14, in the present embodiment). Specifically, the first side plate portion 72 is disposed upright, having a lower end portion integrated with a front end portion of the boom plate portion 71 and an upper end portion connected to the auxiliary support member 90.

The second side plate portion 73 configures a side wall which is the other side wall of the upstream portion 42 and located in the vicinity of the second air inlet 56 (the front side of the upper slewing body 14, in the present embodiment). Specifically, the second side plate portion 73 is disposed upright while spaced with the first side plate portion 72 in the second horizontal direction, having a lower end portion integrated with a rear end portion of the bottom plate portion 71 and an upper end portion integrated with the connecting plate portion 74.

The connecting plate portion 74 configures an auxiliary wall interconnecting an upper end of the second side plate portion 73 and the front wall portion 62 of the hood wall 60. Specifically, the connecting plate portion 74 has an inner end portion integrally joined with the upper end portion of the second side plate portion 73 and an outer end portion connected to the front wall portion 62 of the hood wall 60.

The vertical plate portion 75 configures a terminal end wall which closes the terminal end 43 of the upstream portion 42 of the first exhaust duct 40 with respect to the first horizontal direction, and also configures a side wall which is one of the side walls of the downstream portion 44 of the first exhaust duct 40 and which is connected to the terminal end wall. Specifically, the vertical plate portion 75 is formed of a single plate member disposed upright, and is disposed so as to close respective flow paths formed in the upstream portion 42 and the downstream portion 44, across these portions 42, 44, on the right side in the upper slewing body 14, (that is, so as to define the right side of the flow paths).

The second duct member 80 is a member for forming mainly the second exhaust duct 50. The second duct member 80 has a bottom plate portion 81, a first side plate portion 82, and a second side plate portion 83.

The bottom plate portion 81 has a shape of a horizontal flat plate and configures a bottom wall of the cross portion 52 of the second exhaust duct 50, wherein a part of the bottom plate portion 81 in the first horizontal direction (a right-side portion 81a, in the present embodiment) configures a top wall of the upstream portion 42 of the first exhaust duct 40. In other words, the right-side portion 81a of the bottom plate portion 81 functions as an upstream partition wall to separate the cross portion 52 and the upstream portion 42 vertically from each other. The size of the bottom plate portion 81 in the second horizontal direction is approximately equivalent to the size of the bottom plate portion 71 of the first duct member 70 in the same direction. Thus kept is a gap 55 shown in FIG. 7 between the front wall portion 62 and an edge which is one of the both edges of the bottom plate portion 81 with respect to the second horizontal direction and which is closer to the front wall portion 62. This gap 55 allows air to flow into the upstream end portion 53 of the cross portion 52 through the gap 55.

The first side plate portion 82 configures a side wall which is one of the side walls of the cross portion 52 and which is located on the opposite side to the downstream portion 44 of the first exhaust duct 40 (on the left-hand side of the upper slewing body 14, in the present embodiment). Specifically, the first side plate portion 82 is inclined so as to be displaced outward as extending upward (on the left-hand side of the upper slewing body 14), having a lower end portion integrally joined with a left end portion of the bottom plate portion 81 and an upper end portion connected to the top wall portion 61 of the hood wall 60.

The second side plate portion 83 configures the other side wall of the cross portion 52 and also configures a left side wall of the downstream portion 44 of the first exhaust duct 40, i.e., a side wall opposed to the vertical plate portion 75. Specifically, the second side plate portion 83 is disposed upright so as to function as a downstream partition wall to separate the cross portion 52 and the downstream portion 44 in the first horizontal direction from each other, having a lower end portion integrally joined with a right end portion of the bottom plate portion 81 and an upper end portion connected to the top wall portion 61 of the hood wall 60.

Furthermore, in the present embodiment, the edge which is one of the both edges of the bottom plate portion 81 in the first horizontal direction and located on an opposite side to the downstream portion 44 (the left edges in FIGS. 8 and 9) is inclined in such a direction that the edge is far away from the downstream portion 44 in the first horizontal direction as extending toward the second air outlet 58, and the first side plate portion 82 is also inclined in the same manner. The cross portion 52 is thus given such a shape that the width of the cross portion 52, i.e., the size thereof in the first horizontal direction, increases as close to the second air outlet 58, specifically, the shape widen in the first horizontal direction as close to the second air outlet 58 beyond the upstream portion 42 of the first exhaust duct 40.

Moreover, the first and second exhaust ducts 40, 50 are provided with a plurality of sound absorption member to enhance the effect of suppressing noise of the exhaust ducts 40, 50. The sound absorption members provided in the first exhaust duct 40 include, for example, sound absorption members 101, 102, 103, 104, 105, and 106 that are attached to a lower surface of the bottom plate portion 71, an inner surface of the first side plate portion 72, an inner surface of the second side plate portion 73, an inner surface of the vertical plate portion 75, a lower surface of the right-side portion 81a of the bottom plate portion 81 and an inner surface of the second side plate portion 83, respectively. The sound absorption members provided in the second exhaust duct 50 include, for example, sound absorption members 111, 112, 113, and 114 that are attached to a lower surface of the bottom plate portion 81, lower and upper surfaces of the first side plate portion 82, and the inner surface of the second side plate portion 83, respectively.

The foregoing structure, wherein the first exhaust duct 40 includes, in addition to the upstream portion 42 extending in the first horizontal direction, the downstream portion 44 extending upward from the terminal end 43 of the upstream portion 42, the upper end of the downstream portion 44 forming the first air outlet 48 opened upward, allows air to be well discharged through the first air outlet 48 even if the exhaust gas treatment device 29 or other components exists in the vicinity of the first air outlet 48. Moreover, the cross portion 52 of the second exhaust duct 50 different from the first exhaust duct 40 is formed by effective utilization of a dead space as a result of the shape of the first exhaust duct 40, i.e., a space immediately above the upstream portion 42, which is located lateral to the downstream portion 44 (to the left in FIG. 9), the cross portion 52 enabling the air to flow across the space immediately above the upstream portion 42, from the second air inlet 56 of the second exhaust duct 50, independently of the first exhaust duct 40, to reach the second air outlet 58. This allows both of the first and second exhaust ducts 40, 50 to be arranged without significant increase in the height of the engine hood 36 or the entire height of the engine room, thereby allowing a large total exhaust flow path area to be created without deteriorating the noise suppression effect. In other words, differently from simple increase in the flow path area of a single exhaust duct, the increase involving deterioration in the noise suppression effect, the arrangement of both of the first and second exhaust ducts 40, 50 by utilization of the dead space enable the total flow path area to be increased without significant increase in the size of the engine room and while making the flow path area of each exhaust duct 40, 50 optimal enough to obtain the noise suppression effect.

In addition, the cross portion 52 according to the present embodiment, having such a shape that the size in the first horizontal direction increases as extending from the second air inlet 56 toward the second air outlet 58, can reduce the difference between respective opening areas of the second air outlet 58 and the second air inlet 56 to thereby a favorable flow of air in the second exhaust duct to be ensured even in the case where the opening area of the plurality of second openings 68 configuring the second air outlet 58 is limited due to the shape of the engine hood 36, for example, in the case where the vertical size of each of the second openings 68 is limited due to the presence of the curved portion of an upper end of the rear wall portion 63.

Specifically, it is preferred that the difference between respective opening areas of the second air inlet 56 and the second air outlet 58 is small because a significantly smaller opening area of the second air outlet 58 than that of the second air inlet 56 would generate a so-called orifice phenomenon in the second air outlet 58 to thereby prevent a sufficient noise suppression effect from being obtained; however, there can be a case where each of the plurality of second openings 68 configuring the second air outlet 58 is unable to have a large height. On contrast, the cross portion 52 having such a shape that the size thereof in the first horizontal direction increases as extending from the second air inlet 56 toward the second air outlet 58 enables the width of the second air outlet 58 to be greater than the width of the second air inlet 56 to allow the opening area of the second air outlet 58 to be close to that of the second air inlet, even with a significant limitation in increase in the opening area of the second air outlet 58.

In addition, the engine hood 36 according to the present embodiment includes a shared wall configuring a part of a wall of the first exhaust duct 40 while configuring a part of a wall of the second exhaust duct 50, specifically: the right-side portion 81*a* of the bottom plate portion 81 which vertically separates the upstream portion 42 of the first exhaust duct 40 and the cross portion 52 of the second exhaust duct 50 from each other to configure both the top wall of the upstream portion 42 and the bottom wall of the cross portion 52; and the second side plate portion 83 that separates the downstream portion 44 of the first exhaust duct 40 and the cross portion 52 of the second exhaust duct 50 in the first horizontal direction from each other to configure a side wall of the downstream portion 44 and a side wall of the cross portion 52. Thus sharing a part of the wall of the first exhaust duct 40 and a part of the wall of the second exhaust duct 50 allows the weight of the engine hood 36 to be reduced and allows the engine hood 36 to have a reduced size by the vicinity of the first and second exhaust ducts 40, 50 to each other.

On the other hand, the present embodiment includes: the second side plate portion 72 which is one of the first and second side plate portions 72 and 73 opposed to each other in the second horizontal direction across the upstream portion 42 of the first exhaust duct 40 therebetween and which is closer to the second air inlet 56 than the first side plate portion 72; and the front wall portion 62 of the hood wall 60 located outside the second side plate portion 73, the second side plate portion 73 and the front wall portion 62 constituting the inlet-side portion 54 located below the upstream end portion 53 of the cross portion 52 of the second exhaust duct 50: this makes it possible to guide the air flowing under the cross portion 52 to the upstream end portion 53 of the cross portion 52 with no addition of elements.

The specific structures of the first and second exhaust ducts according to the present invention are not limited to the structures according to the foregoing embodiment. The first and second exhaust ducts may be formed of respective members that are completely independent from each other.

The present invention permits the first horizontal direction and the second horizontal direction to be set freely. Meanwhile, it is preferable to set the first horizontal direction to be parallel to the axial direction of the engine output shaft 25 as described above. This arrangement enables the axial flow Fx generated by the cooling fan 30 to promote the flow of air into the upstream portion 42 of the first exhaust duct 40 and also enables the rotational flow Fs generated by the cooling fan 30 to promote the flow of air in the cross portion 52 of the second exhaust duct 50.

In this case, it is further preferable that the second air outlet 58 be provided above a position where a tangential direction of the rotational flow Fs is upward (on the left-hand side in FIGS. 3 and 10), as shown in FIGS. 3, 10 and the like. This allows the discharge of air through the second air outlet 58 to be further enhanced.

The upstream portion of the first exhaust duct and the cross portion of the second exhaust duct according to the invention do not have to be completely horizontal. These portions may be more or less inclined, provided as long as these portions can possess the function of guiding the air along substantially the horizontal direction.

As described above, provided is a construction machine including an engine and an engine room for housing the engine, the engine room having an upper portion formed with an exhaust duct, the exhaust duct being capable of allowing air to be favorably discharged through an air outlet formed at the terminal end of the exhaust duct and having a large flow path area without deteriorating the noise suppression effect.

Provided is a construction machine, including: an engine; an engine room having an external wall enclosing an internal space for housing the engine; a cooled object disposed in the internal space of the engine room; and a cooling fan that is driven to produce cooling air flow for cooling the cooled object in the internal space of the engine room. The external wall of the engine room includes an upper wall portion located on an upper side of the internal space, the upper wall portion being formed with a first exhaust duct and a second exhaust duct for guiding air inside the internal space to an outside of the engine room. The first exhaust duct includes an upstream portion extending in a first horizontal direction and having one end which forms a first air inlet and a downstream portion extending upward from a terminal end of the upstream portion to a first air outlet opened upward in the upper wall portion, the first exhaust duct allowing air to flow from the first air inlet to the first air outlet. The second exhaust duct includes a cross portion crossing the upstream portion of the first exhaust duct on an upper side of the upstream portion in a second horizontal direction perpendicular to the first horizontal direction, the second exhaust duct having a second air inlet opened downward at a position sideward of the upstream portion of the first exhaust duct with respect to the second horizontal direction and a second air outlet opened laterally at a position opposite to the air inlet across the cross portion in the upper wall portion. The cross portion allows air to flow from the second air inlet to the second air outlet through an upper side of the upstream portion of the first exhaust duct.

Note that the expressions "extending in the first horizontal direction" and "crossing in the second horizontal direction" specify that each of the upstream portion of the first exhaust duct and the cross portion of the second exhaust duct has a shape substantially along a horizontal direction so as to be able to guide the air in the horizontal direction, not intending to exclude one whose wall constituting the upstream portion or the cross portion is inclined with respect to a horizontal surface.

According to this construction machine, the first exhaust duct includes, in addition to the upstream portion extending in the first horizontal direction, the downstream portion extending upward from the terminal end of this upstream portion, the downstream portion having an upper end which configures the first air outlet that is opened upward; this allows air to be favorably discharged through the first air outlet, even if other devices and structures exists in the vicinity of the first air outlet. Moreover, the cross portion of the second exhaust duct different from the first exhaust duct is formed with effective utilization of a dead space formed due to the shape of the first exhaust duct, i.e., a space located immediately above the upstream portion and sideward of the downstream portion, the cross portion allowing the air to flow across the space immediately above the upstream portion, from the second air inlet of the second exhaust duct, to reach the second air outlet; this allows the first and second exhaust ducts to be arranged independently from each other without significant increase in the entire height of the engine room. This makes it possible, differently from enlarging the flow path area of a single exhaust duct, to create a large total flow path area of the first and second exhaust ducts without deteriorating the noise suppression effect.

In the case of the construction machine where the engine has an engine output shaft and the cooling fan includes a plurality of blades that are coupled to the engine output shaft so as to be rotated about a fan rotational axis parallel to the axial direction of the engine output shaft, and where the plurality of blades is rotated to thereby form an axial flow in a direction parallel to an axial direction of the engine output shaft and a rotational flow around the axis parallel to the axial direction of the engine output shaft, it is preferred that the first horizontal direction be parallel to the axial direction of the engine output shaft. Of the flows of air formed by the cooling fan, the axial flow in the direction parallel to the axial direction of the engine output shaft, that is, in the first horizontal direction, promotes the flow of air to the upstream portion of the first exhaust duct extending in the first horizontal direction, while the presence of the rotational flow around the axis parallel to the first horizontal direction promotes the flow of air in the cross portion of the second exhaust duct crossing the upstream portion in the second horizontal direction perpendicular to the first horizontal direction, on the upper side thereof.

In this case, it is more preferable that the second air outlet of the second exhaust duct be provided upward of the position where the tangential direction of the rotational flow is upward. This makes the promotion of the discharge of the rotational flow of air through the second air more remarked.

Although the first and second exhaust ducts may be formed from members that are completely independent from each other, it is more preferable that the upper wall portion of the engine room include at least one shared wall that configures both a part of a wall of the first exhaust duct and a part of a wall of the second exhaust duct. Inclusion of the shared wall, i.e., the share of a part of the wall of the first exhaust duct and a part of the wall of the second exhaust duct, contributes to reduced weight of the upper wall portion and further contribute reduced size of the upper wall portion by arrangement of the first and second exhaust ducts close to each other.

Preferable examples of the at least one shared wall described above include: an upstream partition wall that vertically separates the upstream portion of the first exhaust duct and the cross portion of the second exhaust duct from each other to configure both of the top wall of the upstream portion and the bottom wall of the cross portion; and a downstream partition wall that separates the downstream portion of the first exhaust duct and the cross portion of the second exhaust duct from each other in the first horizontal direction to configure both of a side wall of the downstream portion and a side wall of the cross portion.

It is also preferable: that the upper wall portion includes a pair of opposition side walls opposed to each other in the second horizontal direction across the upstream portion of the first exhaust duct therebetween and an external side wall located on an outer side of one side wall of the opposition side walls, the one side wall being closer to the second air inlet; and that the opposition side wall closer to the second air inlet and the external side wall constitute an inlet-side portion which is a part of the second exhaust duct and located under an upstream end portion of the cross portion of the second exhaust duct. This inlet-side portion is capable of guiding the air flowing under the cross portion to the upstream end portion of the cross portion.

The specific shapes of the first and second exhaust ducts can be set as appropriate: it is preferable that the cross portion of the second exhaust duct has a shape having a size in the first horizontal direction, the size increasing as the cross portion extends from the second air inlet toward the second air outlet. The shape makes it possible to create a favorable flow of air in the second exhaust duct by reducing the difference between the opening area of the second air outlet and the opening area of the second air inlet, even in the case where the shape of the upper wall portion imposes a limitation in the opening area of the second air outlet opened in the upper wall portion. If the opening area of the second air outlet was significantly smaller than the opening area of the second air inlet, a so-called orifice phenomenon would occur in the second air outlet to prevent a noise suppressing effect from being sufficiently obtained; in contrast, the shape of the cross portion having a size in the first horizontal direction, the size increasing as the cross portion extends from the second air inlet toward the second air outlet as described above, allows the opening area of the second air outlet to be close to the opening area of the second air inlet, regardless of the limitation in increasing the opening area of the second air outlet.

This application is based on Japanese Patent application No. 2015-115375 filed in Japan Patent Office on Jun. 8, 2015, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A construction machine, comprising:
   an engine;
   an engine room having an external wall enclosing an internal space for housing the engine;
   a cooled object disposed in the internal space of the engine room; and
   a cooling fan that is driven to produce cooling air flow for cooling the cooled object in the internal space of the engine room, wherein:
   the external wall of the engine room includes an upper wall portion located on an upper side of the internal space, the upper wall portion being formed with a first exhaust duct, and a second exhaust duct for guiding air inside the internal space to an outside of the engine room;
   the first exhaust duct includes an upstream portion extending in a first horizontal direction and having one end which forms a first air inlet and a downstream portion extending upward from a terminal end of the upstream portion to a first air outlet opened upward in the upper wall portion, the first exhaust duct allowing air to flow from the first air inlet to the first air outlet; and the second exhaust duct includes a cross portion crossing the upstream portion of the first exhaust duct on an upper side of the upstream portion in a second horizontal direction perpendicular to the first horizontal direction, the second exhaust duct having a second air inlet opened downward at a position sideward of the upstream portion of the first exhaust duct with respect to the second horizontal direction and a second air outlet opened sideward at a position opposite to the air inlet across the cross portion in the upper wall portion, the cross portion allowing air to flow from the second air inlet to the second air outlet through an upper side of the upstream portion of the first exhaust duct.

2. The construction machine according to claim 1, wherein: the engine has an engine output shaft; the cooling fan includes a plurality of blades coupled to the engine output shaft so as to be rotated about a fan rotational axis parallel to an axis of the engine output shaft; the plurality of blades are rotated to thereby form an axial flow in a direction parallel to the axial direction of the engine output shaft and a rotational flow around the axis parallel to the axial direction of the engine output shaft; and the first horizontal direction is parallel to the axial direction of the engine output shaft.

3. The construction machine according to claim 2, wherein the second air outlet of the second exhaust duct is provided above a position where a tangential direction of the rotational flow is upward.

4. The construction machine according to claim 1, wherein the upper wall portion of the engine room includes at least one shared wall that configures both a part of a wall of the first exhaust duct and a part of a wall of the second exhaust duct.

5. The construction machine according to claim 4, wherein the at least one shared wall includes an upstream partition wall that vertically partitions the upstream portion of the first exhaust duct and the cross portion of the second exhaust duct from each other to configure both of a top wall of the upstream portion and a bottom wall of the cross portion.

6. The construction machine according to claim 4, wherein the at least one shared wall includes a downstream partition wall that partitions the downstream portion of the first exhaust duct and the cross portion of the second exhaust duct from each other in the first horizontal direction to configure both a side wall of the downstream portion and a side wall of the cross portion.

7. The construction machine according to claim 1, wherein: the upper wall portion includes a pair of opposition side walls opposed to each other in the second horizontal direction across the upstream portion of the first exhaust duct therebetween and an external side wall located on an outer side of one side wall of the opposition side walls, the one side wall being closer to the second air inlet; and the opposition side wall closer to the second air inlet and the external side wall constitute an inlet-side portion which is a part of the second exhaust duct and located under an upstream end portion of the cross portion of the second exhaust duct.

8. The construction machine according to claim 1, wherein the cross portion of the second exhaust duct has a shape having a size in the first horizontal direction, the size increasing as the cross portion extends from the second air inlet toward the second air outlet.

\* \* \* \* \*